United States Patent [19]

Overstreet

[11] 4,197,744

[45] Apr. 15, 1980

[54] GAS SAFETY ROOF GAUGING CONTROL HATCH ADAPTER

[76] Inventor: Robbie J. Overstreet, 205 - 20th St., Crane, Tex. 79731

[21] Appl. No.: 933,419

[22] Filed: Aug. 14, 1978

[51] Int. Cl.[2] .............................................. G01N 1/12

[52] U.S. Cl. ............................ 73/421 B; 33/126.4 A; 73/425.4 R

[58] Field of Search .......... 73/291, 297, 298, 425.4 R, 73/421 B; 33/126.4 A, 126.4 R, 126.7 R

[56] References Cited

U.S. PATENT DOCUMENTS

| | | | |
|---|---|---|---|
| 2,617,302 | 11/1952 | Massiot | 73/298 |
| 3,033,311 | 5/1962 | Edgar et al. | 33/126.7 R X |
| 3,049,920 | 8/1962 | Allen | 73/291 |
| 3,098,386 | 7/1963 | Kennepohl | 73/297 |
| 3,113,457 | 12/1963 | Fanshier | 73/298 |
| 3,488,855 | 1/1970 | Howe | 33/126.7 R |
| 3,613,310 | 10/1971 | Rynberk | 33/126.7 R X |
| 4,049,196 | 9/1977 | Bergami, Jr. | 33/126.7 R X |

*Primary Examiner*—Daniel M. Yasich
*Attorney, Agent, or Firm*—Marcus L. Bates

[57] ABSTRACT

A gas safety control hatch attached to the top of a crude oil storage or stock tank. The hatch has a lid which can be opened to enable the contents of the stock tank to be gauged. A liquid lock apparatus is provided between the interior of the hatch and the interior of the stock tank. The liquid lock comprises a downwardly extending conduit having one end opened into the hatch and the other end opened in proximity of the bottom of the stock tank so that liquid always covers the lower, marginal end of the conduit whenever any appreciable amount of crude is stored in the stock tank. Accordingly, when the lid of the hatch is opened, no obnoxious fumes from the vapor space within the tank can flow into the hatch; and accordingly, the tank can be safely gauged by running a sampling apparatus down through the conduit and into communication with the liquid phase of the tank contents.

7 Claims, 4 Drawing Figures

GAS SAFETY ROOF GAUGING CONTROL HATCH ADAPTER

BACKGROUND OF THE INVENTION

During the production of crude oil, it is necessary to pump the crude from the wellbores into a battery of crude oil storage tanks, sometimes called a tank farm, where the crude oil is accumulated until a sufficient quantity is on hand to justify transportion through the pipeline to the refinery. From time to time, the individual crude storage tanks must be gauged in order to determine the amount of crude contained therewithin.

The oilfield hand, or workman, who gauges the crude stock tanks of the tank farm is called a Gauger or a Pumper. The gauger has a sampling apparatus called a thief which he lowers into the tank to a predetermined depth and then trips the thief, whereupon the tank liquid fills the thief. When the thief is brought out of the tank, a tank sample at a specified depth is available for subsequent analysis. At the same time, the depth of the tank is gauged or measured.

The top of the stock tank is provided with an opening, usually in the form of a hatch, and when the lid of the hatch is opened, the gauger sometimes is rendered unconscious because of inhalation of hydrogen sulfide, which often is fatal if the gauger does not immediately recognize his plight and remove himself from proximity of the deadly gas.

Hydrogen sulfide is very corrosive, and when it escapes from the interior of the tank and admixes with moisture and atmospheric oxygen, the exterior of the tank is rapidly eaten away by the corrosive action of the hydrogen sulfide.

Accordingly, it would be desirable to eliminate the above recited dangers associated with the deadly hydrogen sulfide contained within the vapor space of a stock tank. Such a desirable expedient would necessarily have to include means by which the gauger could continue to sample the tank. Apparatus which achieves this desirable goal is the subject of the instant invention.

SUMMARY OF THE INVENTION

This invention comprehends a gas safety control hatch adapter apparatus to facilitate gauging a crude oil stock tank wherein the tank contents has a liquid phase and a vapor phase.

The apparatus includes a hatch in the form of a housing having a closure means at the upper end thereof. The housing is attached to the roof of the stock tank. A floor is provided at the lower end of the housing in spaced relationship to the lid which forms the closure means.

A conduit is affixed to the floor of the hatch and extends down into the tank such that one end of the conduit opens in proximity to the bottom of the tank while the other end opens into the interior of the housing.

When any appreciable quantity of crude is contained within the tank, the liquid level of the crude is located above the lower, open end of the conduit; and therefore, the crude liquid level divides the interior of the storage tank into a liquid space and a vapor space.

Since the conduit extends from attached relationship from the housing down into the interior of the tank where the other end of the conduit opens into the liquid phase, the lower, marginal end of the conduit provides a liquid lock respective to the interior of the housing and the vapor space of the tank. Therefore, the closure means for the hatch can be opened with no danger of deadly vapors flowing into the hatch. The tank can be gauged and sampled by running a suitable gauging and sampling apparatus down through the interior of the conduit and into the liquid phase.

Accordingly, a primary object of the present invention is the provision of a gas safety control hatch which prevents communication between the interior of the hatch and the vapor space of the tank, and which facilitates sampling and gauging of the tank contents.

Another object of the invention is the provision of a gas safety control hatch which enables a crude oil storage tank to be sampled and gauged with no resulting danger from any deadly, gaseous products which may be contained within the vapor space of the tank.

A further object of this invention is the provision of a new method by which the contents of a storage tank can be gauged without subjecting the exterior of the tank to the deadly gases contained within the vapor space of the tank.

A still further object of this invention is the provision of a combination comprised of a gas safety control hatch and a crude oil storage tank by which the vapors contained within the tank are maintained isolated respective to the interior of the hatch.

Another and still further object of this invention is the provision of improvements in apparatus by which the contents of a tank can be measured and sampled in an unusual and unexpected manner.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Throughout the remainder of this specification, like numerals generally refer to like or similar parts.

Figure 1:
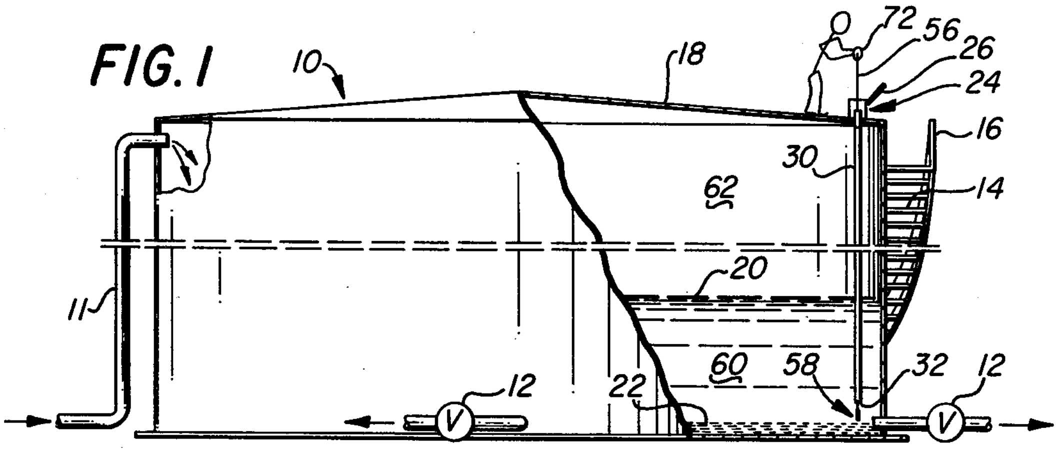
FIG. 1 is a broken, part cross-sectional, side elevation view of a crude storage tank having a gas safety control hatch made in accordance with the present invention diagrammatically illustrated in combination therewith.

In FIG. 1, there is broadly disclosed a crude oil storage tank 10 having various inflow and outflow lines and valves 11 and 12 connected thereto. A ladder 14 enables a gauger to climb to the catwalk 16 located near the roof 18 of the tank. As the crude storage tank is filled with crude 60, the liquid level 20 thereof divides the interior of the tank into a vapor phase 62 and liquid phase 60. Water and debris settle to form BS and W at 22.

The roof of the tank is provided with a gas safety control hatch 24 made in accordance with the present invention. The hatch serves as a means by which the tank contents can be inspected, and includes a closure member in the form of a lid 26 hinged to the main body 28. The sidewall 36 preferably upwardly depend from attached relationship respective to the roof, although the hatch could instead be formed into a depression below the roof should such an expedient be desirable.

Conduit 30 is supported from attached relationship respective to the housing and has a lowermost open end 32 placed in close proximity to the bottom of the tank.

The closure means preferably is hinged at 34 to the sidewalls 36, thereby providing an upwardly or outwardly opening interior 38. Fastener means 40 maintains the lid in a closed configuration. The bottom 42 of the hatch outwardly extends into a flange member 44 which provides a means by which bolts 46 can be used to affix the entire hatch structure to the tank roof.

Coupling 48 is rigidly affixed to the floor, as for example, by welding. Cover 50 is optionally provided for closure of the uppermost end of the conduit. A second coupling member 52 is optionally affixed to the floor 42 with a plug 54 being fitted therewithin in a conventional manner.

Figure 3:
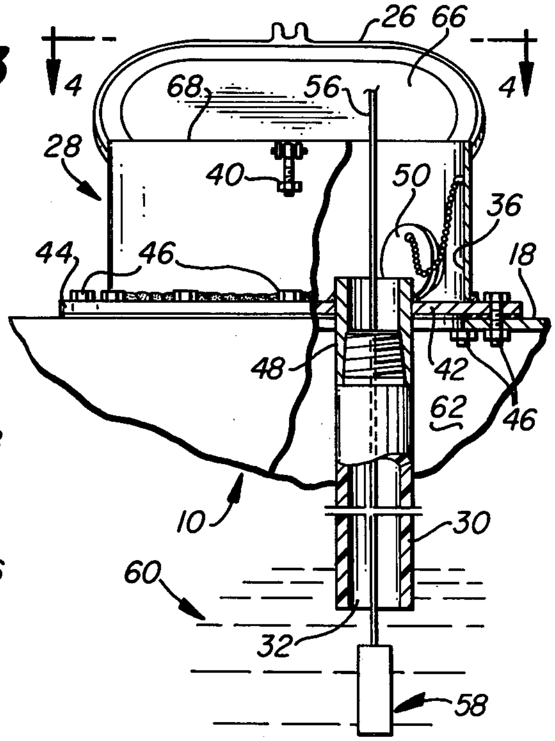
FIG. 3 is similar to FIG. 2 and illustrates the apparatus in operation.
Figure 2:
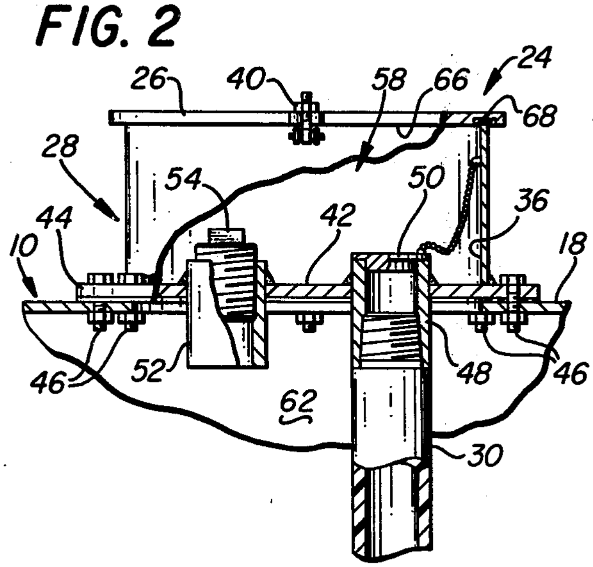
FIG. 2 is an enlarged, fragmentary, part cross-sectional representation of part of the apparatus disclosed in FIG. 1.
Figure 4:
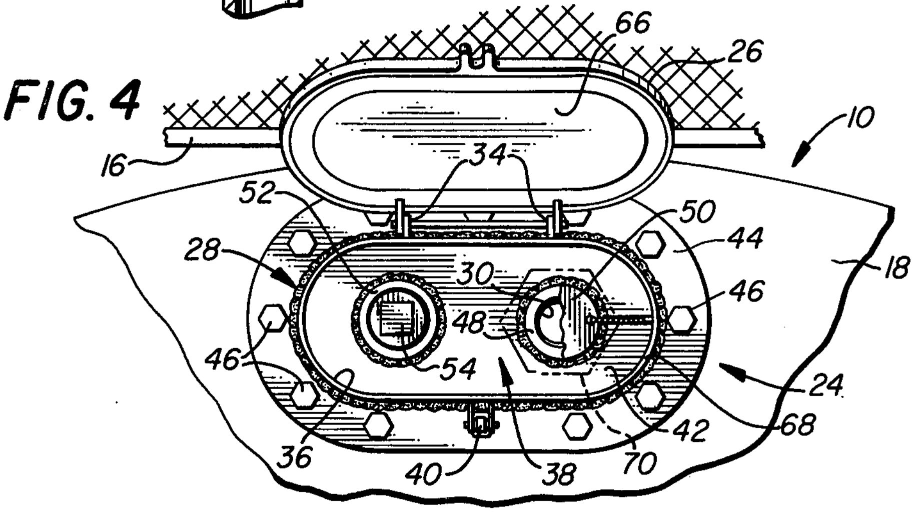
FIG. 4 is a top view of the apparatus disclosed in FIG. 3, looking in the direction indicated by the arrows at numeral 4—4.

As seen in FIG. 3, the lid 26 can be opened to expose the interior of the hatch, whereupon sampling and gauging apparatus 58 can be lowered through the conduit by means of line 56.

The interface 66 of the lid fits against a gasket located on the uppermost peripheral edge 68 of wall 36 to hermetically seal the interior 38 from ambient. Where desired, the coupling 48 can be affixed to the floor 42 by means of a nut 70 located on either side of the floor with a suitable gasket being interposed therebetween.

The conduit 30 preferably is of fiberglass and epoxic resin which provides a composition of high strength, and which is impervious to hydrocarbons.

OPERATION

The apparatus 24 of this invention is bolted onto the roof of a storage tank, and the length of conduit 30 selected to cause the lower open end 32 thereof to terminate approximately ten inches off the bottom of the tank. When the tank is filled with any significant quantity of liquid, a vapor phase 62 becomes separated from the interior 38 of the hatch by means of a liquid lock effected by the liquid 60. Accordingly, the vapor phase 62 cannot communicate with the interior 38 of the hatch so long as liquid level 20 is above lower pipe end 32; and consequently, communication between the vapor space of the tank and ambient is precluded.

Therefore, a workman can safely climb to the top of the the tank, remove fasteners 40, swing the lid into the open position and run sampling apparatus, such as a thief, down through the interior of tubing 30 where a liquid sample can be obtained at any desired elevation within the tank interior. The liquid level of the tank can be measured as well as BS and W samples being obtained, with no danger of poison gases being inhaled by the gauger.

I claim:

1. In a closed crude oil storage tank having a bottom, sides, and roof, which cooperate together to form an enclosure within which corrosive liquid crude oil having a liquid phase and a vapor phase can be stored, the combination with said tank of a gas safety control hatch;

said hatch having a floor, sidewalls attached to said floor, and a closure means removably affixed to said sidewalls in spaced relationship to said floor;

a hollow conduit through which a sampling apparatus can pass, said conduit having one end coupled to and affixed to said floor such that said one end of said conduit opens into said hatch, and the other end of said conduit downwardly depends from said floor and into the interior of said tank, so that communication is established between the interior of the tank and the interior of said hatch;

the terminal end of said other end of said conduit extends into close proximity of the tank bottom so that when the tank is filled with sufficient liquid to cover the terminal end of said other end of the conduit, a liquid lock is established which prevents communication between the vapor space of the tank and the interior of the hatch, and a person can extend a sampling apparatus from the interior of the hatch, through the conduit, into the liquid phase of the tank, whereupon a liquid sample can be withdrawn without subjecting the person to vapors from the vapor space of the tank.

2. The combination of claim 1 wherein said hatch has a lower end thereof attached to the roof, and said sidewalls are attached to and upwardly extend from the roof;

said conduit is fixed respective to the roof and includes a coupling member affixed to said floor to which there is attached one end of said hollow conduit.

3. In a crude oil storage tank having a corrosive liquid stored therewithin to provide a liquid phase and a vapor phase, said storage tank having a roof and a bottom, and an inspection hatch attached to the roof; the improvement comprising:

said hatch includes a floor spaced from a lid; a hollow conduit having one end mounted in fixed relationship respective to said hatch in a position wherein said conduit upwardly opens into the interior of said hatch; said conduit being of sufficient size to enable a liquid sampling apparatus to be moved therethrough;

said conduit coupled to and downwardly depending from said hatch into the interior of the tank with the other end of the conduit opening below the liquid level which separates the vapor phase from the liquid phase;

whereby the liquid contained within the tank covers the bottom of the conduit and thereby forms a liquid lock which prevents the vapor phase of the tank from communicating with the interior of the hatch, so that a person can extend a sampling apparatus from the hatch, through the interior of the hollow conduit, into the liquid phase of the tank and obtain a sample without communicating the interior of the hatch with the vapor phase of the tank.

4. The improvement of claim 3 wherein said hatch includes a sidewall; the sidewall being attached to the floor and the lid being removably affixed to the upper end of the sidewall such that when the lid is closed, the interior of the hatch is isolated from ambient, as well as being isolated from the vapor space of the tank;

a coupling member formed in said floor by which said conduit is affixed to said hatch, said conduit being an elongated pipe which extends into close proximity of the bottom of the tank so that when any appreciable quantity of liquid is contained within the tank, the vapor space of the tank is separated from the interior of the hatch.

5. A method of isolating the exterior of a corrosive liquid hydrocarbon containing tank from the vapor space contained therewithin so that the liquid phase of the tank is accessible to a person standing on the roof of the tank, comprising the steps of:

(1) fixedly supporting a conduit from the roof of the tank and extending the conduit down into the interior of the tank, with the lower end of the conduit opening in close proximity of the bottom of the tank, and the upper end of the conduit coupled to the roof and opening into the ambient;

(2) isolating the upper end of the conduit from ambient by the provision of a hatch means mounted to the tank roof with the upper end of the conduit opening into the hatch means;

(3) filling the tank with a sufficient quantity of liquid to cover the lower end of the conduit, thereby providing a vapor phase within the tank which is isolated from ambient by a liquid lock formed at the lower marginal end of the conduit;

(4) using the interior of the conduit to run apparatus from the hatch means into contact with the liquid contained within the tank, thereby enabling the tank to be sampled and gauged, while preventing the vapor phase of the tank from reaching a person who may be present at the hatch means.

6. The method of claim 5 and further including the steps of:

(5) making said hatch means by placing a housing on the roof and communicating the interior of the housing and conduit by arranging the upper end of the conduit whereby it opens into the housing;

(6) helically sealing the housing interior from the ambient by placing a removable closure member on the top of the housing.

7. The method of claim 6 wherein the conduit is made of fiberglass material, and the housing is removably attached to said roof.

* * * * *

UNITED STATES PATENT OFFICE
CERTIFICATE OF CORRECTION

Patent No. 4,197,744 Dated April 15, 1980

Inventor(s) ROBBIE J. OVERSTREET

It is certified that error appears in the above-identified patent and that said Letters Patent are hereby corrected as shown below:

First page, under Abstract, line 12, "obnoxious" should read --noxious--;

Column 4, line 32, before "crude" insert --corrosive liquid--; and delete "corrosive" after "a" (second occurrence);

Column 6, line 15, "helically" should read --hermetically--.

Signed and Sealed this

*Ninth* Day of *April 1985*

[SEAL]

*Attest:*

DONALD J. QUIGG

*Attesting Officer* *Acting Commissioner of Patents and Trademarks*